United States Patent [19]

du Pont

[11] Patent Number: 5,002,240
[45] Date of Patent: Mar. 26, 1991

[54] AIRCRAFT PITCH CONTROL SYSTEM

[76] Inventor: Anthony A. du Pont, 7946 Ivanhoe Ave., Suite 316, La Jolla, Calif. 92037

[21] Appl. No.: 11,607

[22] Filed: Feb. 6, 1987

Related U.S. Application Data

[63] Continuation-in-part of Ser. No. 766,542, Aug. 19, 1985, abandoned.

[51] Int. Cl.$^5$ ................................................ B64C 9/00
[52] U.S. Cl. ..................................... 244/87; 244/224; 244/75 A
[58] Field of Search .......................... 244/224, 87, 75 A

[56] References Cited

U.S. PATENT DOCUMENTS

| | | | |
|---|---|---|---|
| 2,260,481 | 10/1941 | Ranasey | 244/224 |
| 2,570,586 | 10/1951 | Nix | 244/224 |
| 2,613,891 | 10/1952 | Knight | 244/87 |
| 3,138,353 | 6/1964 | Steiner | 244/87 |
| 3,207,458 | 9/1965 | Kean | 244/87 |
| 3,949,958 | 4/1976 | Richter | 244/87 |
| 4,141,520 | 2/1979 | Beijer et al. | 244/224 |
| 4,173,322 | 11/1979 | Macdonald | 244/224 |

*Primary Examiner*—Joseph F. Peters, Jr.
*Assistant Examiner*—Christopher P. Ellis

[57] ABSTRACT

An aircraft pitch control system which includes a movable tail composed of a powered stabilizer which is angularly movable about a first axis, and elevators mounted on the rear end of the stabilizer which are angularly rotatable about a second axis displaced from the first axis. The stabilizer is controlled by an electric, pneumatic or hydraulically powered actuator, and the elevators are controlled manually through appropriate cables or mechanical linkage. The stabilizer actuator is controlled by movements of the elevators through an appropriate servo mechanism, so that angular movement of the stabilizer follows angular movement of the elevators. In the event of failure of the stabilizer actuator, the stabilizer is locked in a selected position by an automatic lock, and the pitch of the aircraft is controlled manually by the elevators alone.

5 Claims, 2 Drawing Sheets

AIRCRAFT PITCH CONTROL SYSTEM

BACKGROUND OF THE INVENTION

This application is a continuation-in-part of Copending Application Ser. No. 766,542 filed Aug. 19, 1985 now abandoned.

The aircraft pitch control system of the present invention is of the same general type as the "Flying Tail" described in Richter U. S. Patent 3,949,958. The Richter system involves a movable tail comprising a stabilizer actuated by a number of hydraulic actuators, and manually controlled hydraulically operated elevators. The resulting movable tail surfaces provide moments about the center of gravity of the aircraft when the stabilizer and/or elevators are inclined to the air flow.

The Richter "Flying Tail" is designed for large aircraft, and it includes four independent hydraulic systems for operating the stabilizer. These multiple hydraulic are provided for redundancy purposes, because the absence of hydraulic power eliminates all horizontal tail control in the Richter system.

The pitch control system of the present invention, on the other hand, includes an emergency lock for the stabilizer, which operates in the event of power failure, so that pitch control of the aircraft may be carried out manually in the event of such failure. The system of the invention is particularly intended for small aircraft, and because of its ability to exert a manual control in the event of power failure, obviates the need for redundant hydraulic controls for the stabilizer.

It is accordingly an objective of the present invention to provide an improved pitch control system of the type described above, and which is constructed to enable the pilot to revert to manual control in the event of failure of the stabilizer actuator.

A feature of the invention is that because of the ability of manual control of the system in the event of actuator power failure, the stabilizer in the pitch control system of the invention may be actuated by standard hydraulic, pneumatic or electrical power systems, as opposed to the powered stabilizer described in the Richter patent which requires a plurality of independent redundant hydraulic systems to control the stabilizer section of the tail, because absence of hydraulic power eliminates all horizontal tail control in such systems.

The pitch control system of the invention may be constructed to vary its control effectiveness by changing the relationship between the motions of the stabilizer and elevators as a function of flight speeds. At low speeds, large stabilizer movements provide more tail control in a situation where aerodynamic forces are low; whereas at high speeds, it is desirable to provide a lesser stabilizer motion relative to elevator motion because the aircraft is then sensitive to small stabilizer movements when the aerodynamic forces are large.

The foregoing requirement is implemented by an electronic control unit which adjusts the servo response to elevator motion as a function of indicated air speed. By such a control, the desired aircraft acceleration as a function of pilot pressure on the pitch control may be achieved over a wide speed range.

DETAILED DESCRIPTION OF THE ILLUSTRATED EMBODIMENT

Figure 1:
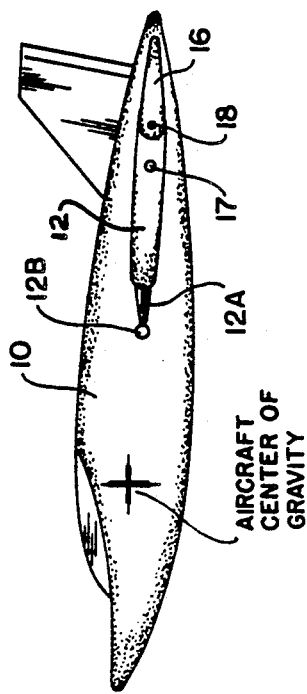
FIG. 1 is a schematic side elevational view of an aircraft equipped with a movable tail incorporating a powered stabilizer and manually controlled elevators suitable for inclusion in the pitch control system of the invention.
Figure 2:
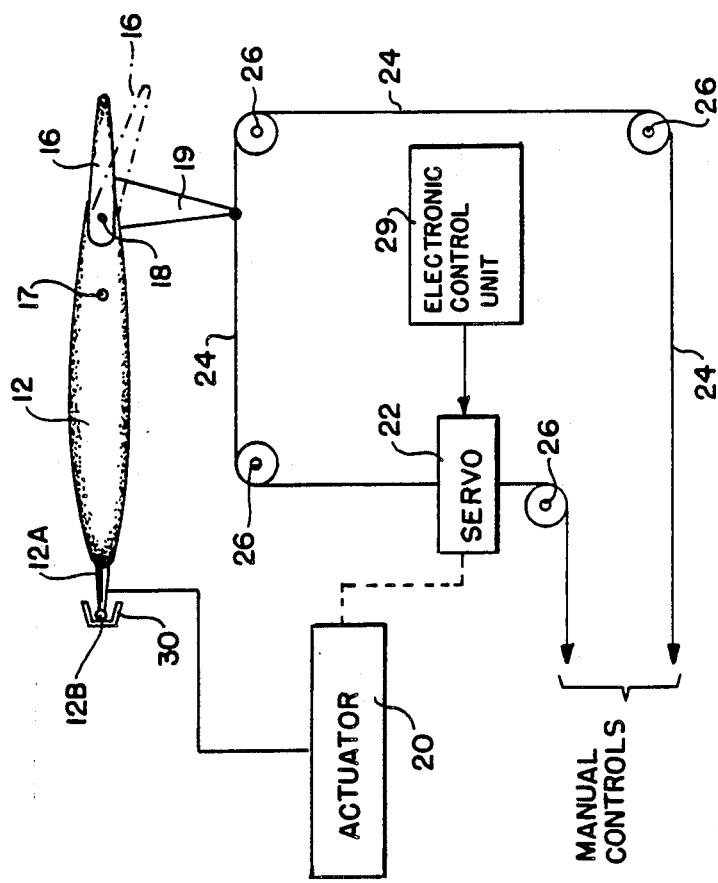
FIG. 2 is a schematic diagram of a stabilizer and elevator control system representing one embodiment of the invention.

As shown in FIGS. 1 and 2, an aircraft 10 is equipped with a stabilizer 12 which is angularly movable about a first axis 17, and having elevators, such as elevator 16, mounted on the rear end of the stabilizer. Elevator 16 is angularly movable about an axis 18 displaced from axis 17. The stabilizer 12 is controlled for angular movement about axis 17 by an actuator 20 which, as stated above, may be electrical, pneumatic, hydraulic, or the like, and which is controlled by a servo mechanism 22. Elevator 16 is controlled for angular movement about axis 18 by a cable 24. Cable 24 is attached to the elevator by an appropriate coupling member 19. The cable extends around pulleys 26. Cable 24 operates a servo mechanism 22 which causes stabilizer 12 to be turned by the powered actuator 20 about axis 17 in response to any manual turning of elevators 16 about axis 18.

An electronic control unit, represented by block 29 is connected to the servo mechanism 22. The electronic control unit 29 operates in known manner to adjust the servo response of mechanism 22 to the movements of cable 24 to be a function of the indicated air speed of the aircraft 10. The electronic control unit causes the relationship between movements of the stabilizer under the control of elevator movements to be a function of flight speed. Accordingly, at low speeds, larger stabilizer motions with respect to elevator motions occur where aerodynamic forces are low; and at high speeds, lesser stabilizer motions relative to elevator motions occur when the aerodynamic forces are large. In this manner, the desired aircraft normal acceleration as a function of pilot pressure on the pitch control may be achieved over a wide speed range.

As mentioned above, a feature of the invention is the provision of an automatic lock 30 which locks the stabilizer in a selected position in the event of failure of actuator power for the stabilizer, so that pitch control of the aircraft may be carried out by manual control of the elevators alone.

Figure 3:
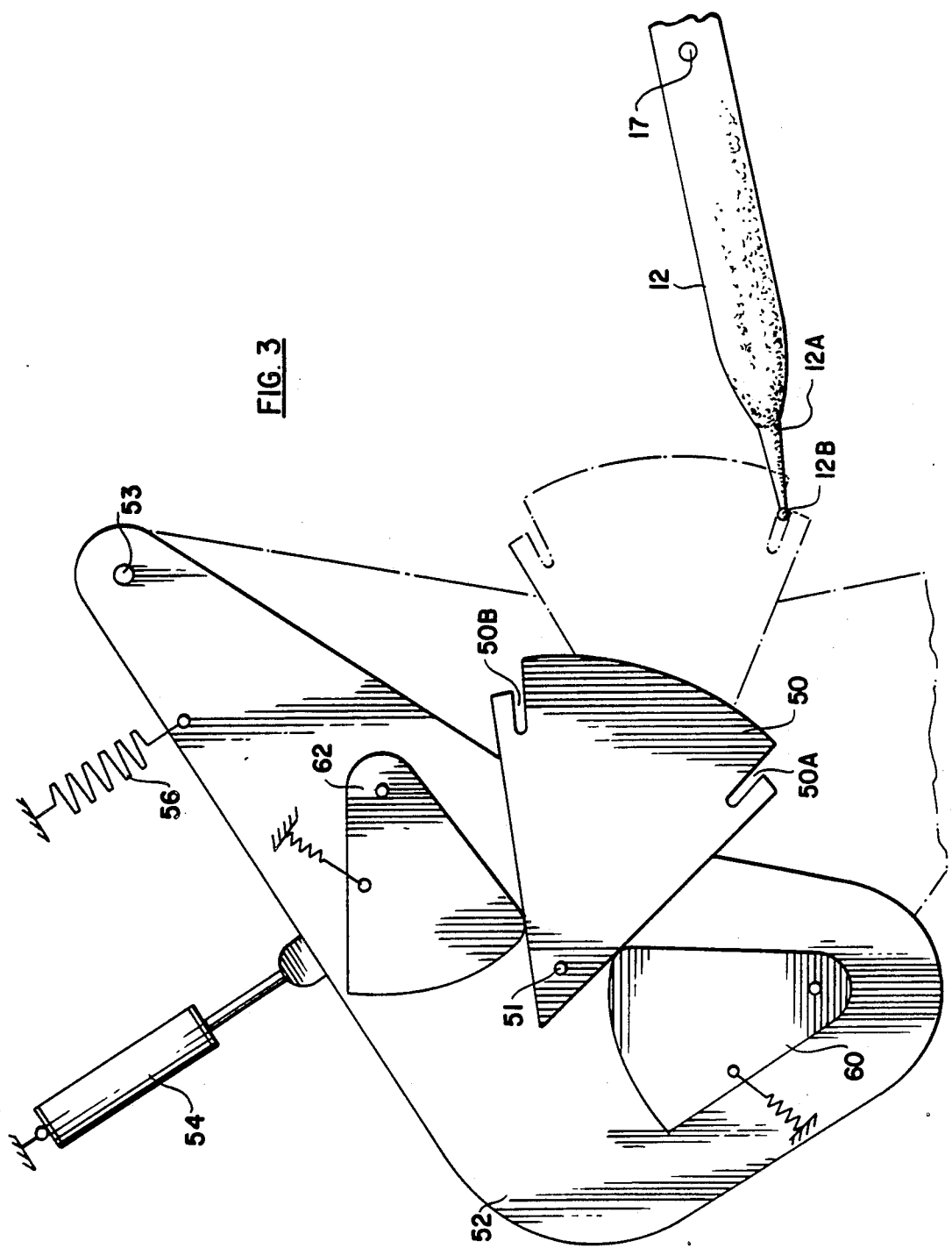
FIG. 3 is a schematic diagram of details of an automatic lock which holds the stabilizer in a selected position in the event of failure of actuator power.

Details of the lock mechanism 30 are shown in the schematic diagram of FIG. 3. The lock mechanism includes a cam 50 which is pivotally mounted on a pivot pin 51 at one end of an arm 52, the other end of the lever arm being pivotally coupled to the frame of the aircraft by pivot pin 53. The arm 52 is controlled by an hydraulic cylinder 54 which, so long as hydraulic pressure exists in the aircraft, and so long as actuator 20 is operative, draws the cam 50 to the left in FIG. 3 to a stand-by position, against the force of a compression spring 56.

However, in the event of failure of hydraulic power, and resulting failure of actuator 20, hydraulic cylinder 54 releases, and compression spring 56 moves the cam 50 to the operative position shown by the broken lines in FIG. 3. The cam is normally held in a neutral angular position about pivot pin 51 by a pair of spring-loaded cams 60 and 62.

Upon the failure of actuator 20, stabilizer 12 moves freely about its pivot axis 17, and a pin 12B at the end of an arm 12A located at the forward end of the stabilizer 12 moves between an upper and lower position in a reciprocal free moving manner. Cam 50 is provided with a pair of notches 50A, 50B at its forward end, and one or the other of these notches serve to catch the pin 12B of the stabilizer 12 either during its downward motion from its uppermost position, or during its upward motion from its lowermost position.

In either event, the ensuing free motion of the stagebilizer 12 moves the cam 50 against either cam 60 or cam 62, and the other cam 60 or 62 moves to lock cam 50 into position. This occurs when pin 12B is axially aligned with pivot pin 51, so that the stabilizer 12 is locked in a horizontal position, and further control of the aircraft is effectuated manually by elevators 16 alone.

When hydraulic power is restored, the brake on pin 51 is released, and hydraulic cylinder 54 again withdraws cam 50 to its stand-by position It will be appreciated that while a particular embodiment of the invention has been shown and described, modifications may be made. It is intended in the claims to cover all modifications which come within the true spirit and scope of the invention.

I claim:

1. A pitch control system for an aircraft which includes a movable tail comprising a stabilizer angularly movable about a first axis, and an elevator angularly movable about a second axis displaced from the first axis; first means coupling said elevator to a manual control to enable said elevator to be moved angularly about said second axis by manual manipulation; a power actuator coupled to said stabilizer for moving said stabilizer angularly about said first axis; a servo mechanism controlled by said manual control and connected to said actuator for operating said actuator as a function of movements of said elevator; and an emergency lock mechanism adapted to engage said stabilizer for locking said stabilizer in a predetermined angular position about said first axis in the vent of failure of said actuator, said emergency lock mechanism including a control member, and said stabilizer having a pin mounted at the forward end thereof normally displaced from said control member but in position to be engaged by said control member in the event of failure of said actuator whereby said control member is moved towards said pin to engage said pin and lock the stabilizer in said predetermined angular position with respect to said first axis.

2. The system defined in claim 1, in which said coupling means comprises a control cable connected to said servo mechanism, a plurality of pulleys supporting said cable, and coupling means connecting said cable to said elevator, so that movement of said cable around said pulleys by said manual manipulation causes said elevator to move angularly about said second axis and simultaneously controls said servo mechanism.

3. The system defined in claim 1, and which includes an electronic control unit connected to said servo mechanism to cause said servo mechanism to adjust the relative motion between the movements of said elevator about said second axis and the movements of said stabilizer about said first axis to be a function of indicated air speed.

4. The system defined in claim 1, in which said control member is rotated about a predetermined axis by said stabilizer pin when said stabilizer pin engages said control member, and which includes a brake mechanism which is operated by said control member to lock said control member against further rotation about said predetermined axis when said stabilizer reaches said predetermined position with respect to said first axis.

5. The system defined in claim 4, in which said control member includes a first notch for engaging said stabilizer pin upon angular movement of said stabilizer in a first direction, and a second notch for engaging said stabilizer pin upon angular movement of said stabilizer in a second direction, with the resulting rotation of said control member about said predetermined axis in either direction actuating said brake when said stabilizer reaches said predetermined position with respect to said first axis.

* * * * *